United States Patent [19]

Andrejco et al.

[11] 4,417,692
[45] Nov. 29, 1983

[54] VAPOR-PHASE AXIAL DEPOSITION TORCH

[75] Inventors: Matthew J. Andrejco, North Hanover Township, Burlington County; Eugene Potkay, Hamilton Township, Mercer County, both of N.J.

[73] Assignee: Western Electric Co., Inc., New York, N.Y.

[21] Appl. No.: 371,628

[22] Filed: Apr. 26, 1982

[51] Int. Cl.³ .............................................. F23D 13/36
[52] U.S. Cl. ..................................................... 239/424
[58] Field of Search ......... 239/416, 417, 420, 422–424

[56] References Cited

U.S. PATENT DOCUMENTS

| 932,739 | 8/1909 | Wiss | 239/424 |
|---|---|---|---|
| 1,313,605 | 8/1919 | Reynolds | 239/417 X |
| 3,073,534 | 1/1963 | Hampshire | 239/422 |
| 3,642,521 | 2/1972 | Moltzan et al. . | |
| 3,644,607 | 2/1972 | Roques et al. . | |
| 3,698,936 | 10/1972 | Moltzan . | |
| 3,966,446 | 6/1976 | Miller . | |
| 4,062,665 | 12/1977 | Izawa et al. . | |
| 4,135,901 | 1/1979 | Fujiwara et al. . | |
| 4,162,908 | 7/1979 | Rau et al. . | |
| 4,224,046 | 9/1980 | Izawa et al. . | |
| 4,242,118 | 12/1980 | Irven . | |

FOREIGN PATENT DOCUMENTS 163782  5/1921  United Kingdom ................. 239/422

Primary Examiner—Andres Kashnikow
Attorney, Agent, or Firm—D. J. Kirk

[57] ABSTRACT

A reactant deposition torch (10) has a plurality of concentric glass tubes (16, 18, 20, 24 and 26). Various gases pass through the tubes (18, 20, 24 and 26) while particle producing reactants pass through the inner tube (16). The concentricity of the tubes is accurately maintained by a plurality of precision machined splines located on the outer periphery of the inner and intermediate tubes (16, 18, 20 and 24). Additionally, the inner tube (16) is movable in the axial direction during the deposition process to controllably alter the amount of reactant to be deposited.

4 Claims, 8 Drawing Figures

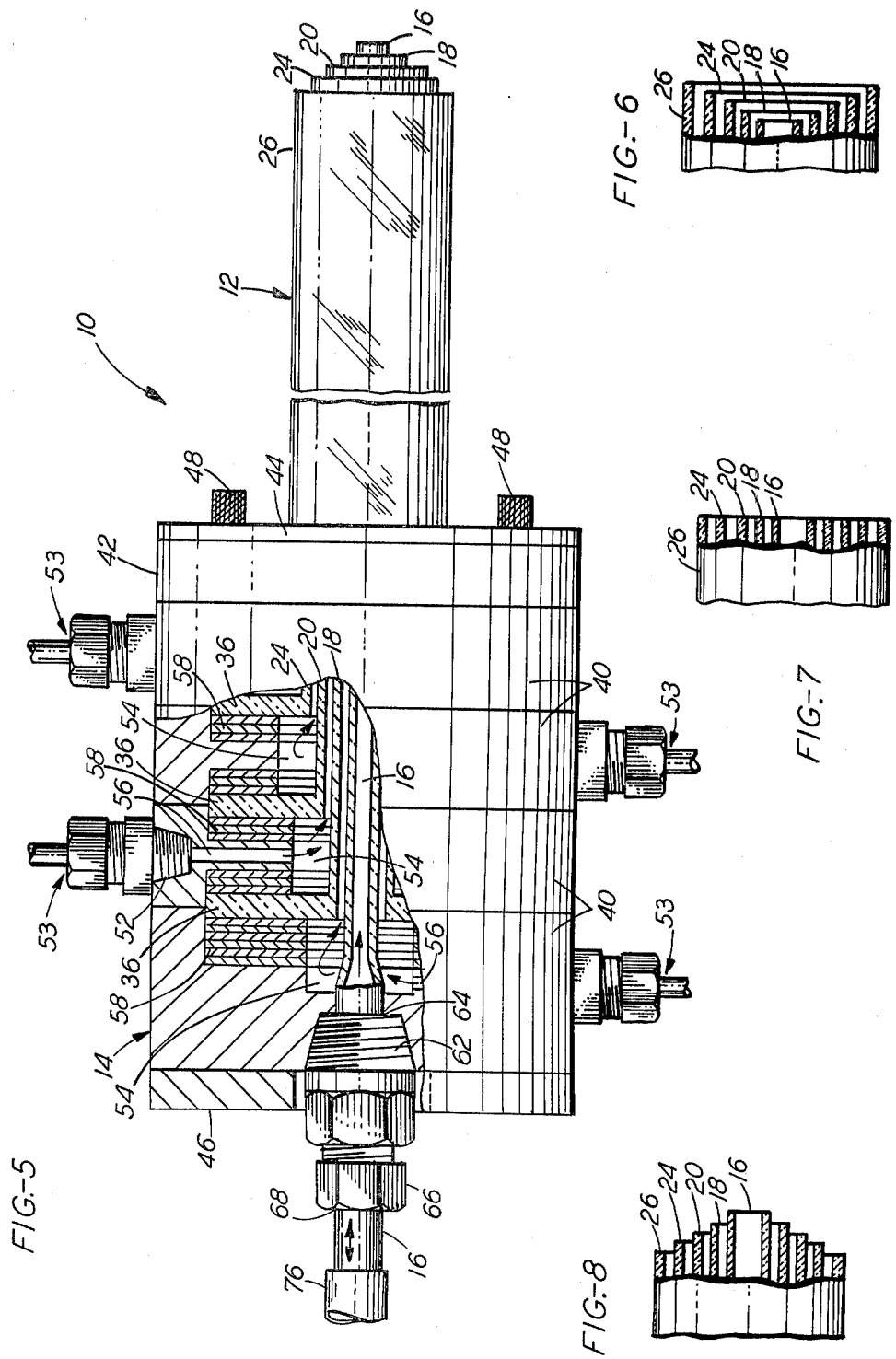

VAPOR-PHASE AXIAL DEPOSITION TORCH

TECHNICAL FIELD

The instant invention relates to a torch used to fabricate lightguide preforms by the vapor-phase axial deposition (VAD) technique.

BACKGROUND OF THE INVENTION

In the VAD method of fabricating lightguide preforms, materials such as $SiCl_4$, $GeCl_4$, $POCl_3$, $BBr_3$ or the like are fed into an oxy-hydrogen torch and the fine glass soot particles produced by a flame hydrolysis reaction are deposited onto the end surface of a rotating support member as described in U.S. Pat. No. 4,224,046 to Izawa et al. which issued on Dec. 13, 1977. The support member is slowly withdrawn from the torch, as deposition continues, resulting in an elongated, porous soot boule being attached thereto. The boule thus formed is then consolidated into a transparent lightguide preform by heating at an elevated temperature.

Typically, torches used to form the glass soot are unitary fused silica glass structures comprised of a plurality of concentrically aligned cylindrical tubes with means for feeding various gases and reactants into and through the appropriate tubes. Clearly, such torches, once fabricated have fixed dimensions and cannot be readily altered or adjusted which requires that a totally new torch be fabricated at considerable cost.

A torch that overcomes the foregoing problems is described in U.S. patent application Ser. No. 248,906 titled "Universal Torch" filed Mar. 30, 1981 to which a continuing application Ser. No. 486,370 was filed on Apr. 19, 1983. by H. M. Presby and assigned to Bell Telephone Laboratories. That torch is of a reconfigurable construction which can be readily assembled and disassembled to replace and repair parts.

Although such a torch has many advantages over the torches of the type described in the prior art, once in operation the various components become fixed. At times it may be desirable to alter or adjust the location of the discharge end of the inner reactant directing tube to dynamically change the deposition of reactants to controllably alter the refractive index of the resultant lightguide preform. Additionally, it has been found most difficult to fabricate and to maintain such torches in accurate concentric alignment. Lack of such accurate alignment results in nonuniform deposition of reactants on the sootform which can result in poor transmission in fibers drawn therefrom.

Accordingly, there is a need for a reconfigurable torch having accurately spaced concentric tubes wherein the discharge end of the reactant directing tube can be controllably altered during deposition.

SUMMARY OF THE INVENTION

The foregoing problems have been overcome by a torch for fabricating lightguide preforms by the vapor-phase axial deposition process. The torch is comprised of a plurality of coaxially aligned elongated tubes with a coaxially aligned inner tube that is movable in an axial direction relative to the other tubes during the deposition process. Each of the inner and intermediate tubes have a plurality of accurately machined splines on the outer surface thereof to maintain a predetermined distance between said tubes. Additionally, each of the plurality of intermediate tubes and the outer tube has a radially disposed flange on a first end thereof separated and captured between a plurality of annular spacer members.

BRIEF DESCRIPTION OF THE DRAWINGS

FIG. 5 is a cross-sectional view of the instant torch; and

FIGS. 6 to 8 depict several tube end configurations of the instant torch.

DETAILED DESCRIPTION

Figure 1:
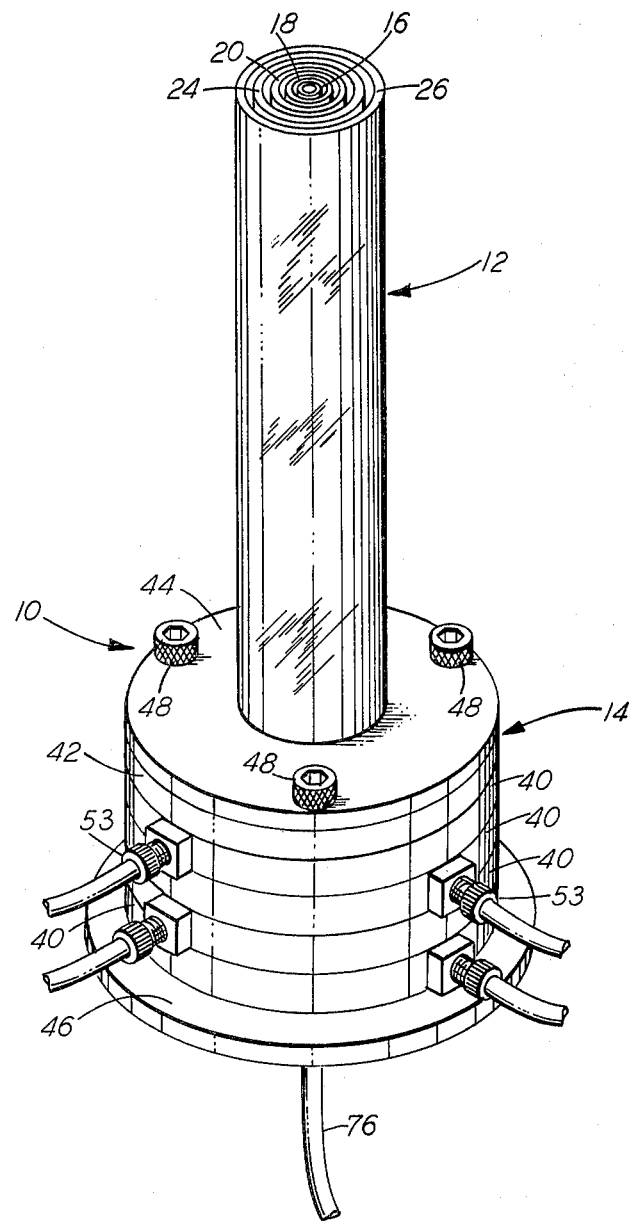
FIG. 1 is an isometric view of the instant torch.

FIG. 1 is an isometric view of the instant torch, generally designated by the numeral 10, having a nozzle 12 and a base 14. The nozzle 12 is comprised of an inner glass tube 16, a plurality of intermediate glass tubes 18, 20 and 24 and an outer glass tube 26 all of which are concentrically mounted one inside the other.

Figure 2:
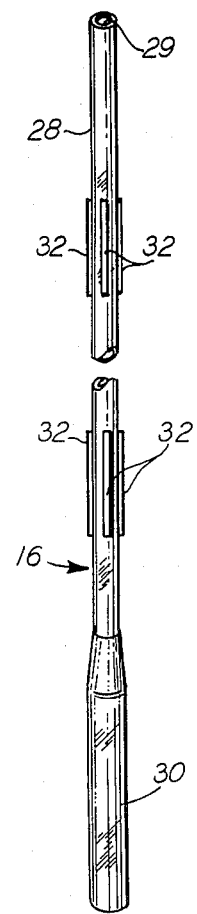
FIGS. 2, 3 and 4 are isometric views of the innermost, intermediate and outer tubes, respectively, used in the torch shown in FIG. 1.

The inner tube 16, as can be seen in FIG. 2, is comprised of a first elongated, small diameter, section 28 having a bore 29 and a large diameter section 30. A plurality of splines 32—32 are fixedly mounted and equally spaced about the periphery of the section 28.

Figure 3:
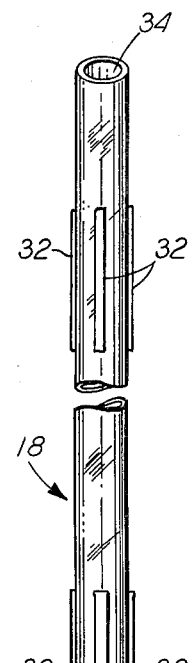

Each of the intermediate tubes 18, 20 and 24 are substantially the same, but have different diameters. Accordingly, only the tube 18 will be described in detail. The tube 18, as shown in FIG. 3, has a substantially uniform diameter bore 34, a plurality of fixedly mounted, equally spaced splines 32—32 on the periphery thereof and a radially extending flange 36 on one end thereof.

Figure 4:
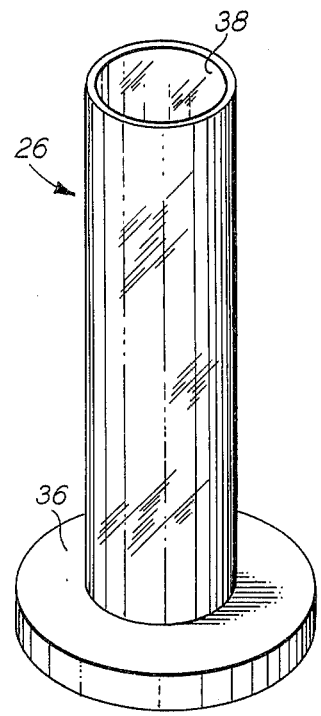

The outer tube 26 (see FIG. 4) is similar to the intermediate tubes 18, 20 or 24 but has a larger diameter bore 38 and does not have any splines on the outer surface thereof. A flange 36 also radially extends from one end thereof.

The concentrically mounted tubes 16, 18, 20, 24 and 26 extend into, and are held in place by, the base 14 as can be seen in the cross-sectional view of FIG. 5. The base 14 is comprised of a plurality of ring support members 40—40 and a top member 42. The support members 40—40 and the top member 42, which are a Teflon polymer material or the like, are held between a top plate 44 and a bottom plate 46 by a plurality of threaded screws 48—48 which pass therethrough. Each of the members 40—40 has an opening 52 in the peripheral wall thereof with a gas line connector 53 threadably inserted therein which communicates with a respective one of a plurality of inner annular chambers 54—54 via a respective one of a plurality of channels 56—56. A plurality of washer shaped spacers 58, which also may be fabricated from a Teflon material, are located above and/or below respective flanges 36—36 of the intermediate tubes 18, 20 and 24 and the outer tube 26. A ferrule 62 having an axial passageway 64 therethrough is threadably inserted into the lowermost support member 40 while a cap 66 having an opening 68 therein is threadably positioned thereon.

The torch 10 is fabricated by inserting the intermediate tubes 18, 20 and 24 inside, and concentric with, the outer tube 26. The splines 32—32 have an accurately machined thickness which maintains a predetermined, spaced, relation between said tubes. The splines 32 have a substantially rectangular or hemispherical geometry. The flanges 36 are positioned between the ring support members 40—40. Additionally, the annular shaped spacers 58—58 are located above and/or below each flange 36. Advantageously, the number of spacers 58—58 above and below each flange 36 may be readily changed in order to alter the height of one or more tubes relative to the other tubes. Thus, the end configuration of the nozzle 12 may be readily rearranged resulting in various configurations, only three of which are shown in FIGS. 6, 7 and 8.

In addition to altering the configuration of the end of the nozzle 12, the inner tube 16 may be inserted through the opening 68 in the cap 66, through the passageway 64 in the ferrule 62, into the innermost intermediate tube 18 as shown in FIG. 5. The position of the inner tube 16 may be readily adjusted by sliding the tube 16 along the passageway 64 to position the end thereof at the desired point relative to the ends of the other tubes 18, 20, 24 and 26.

In operation, the torch 10 is positioned with the nozzle 12 directed at a starting member or bait rod (not shown) associated with the VAD process as described in copending patent application Ser. No. 371,629 titled "Vapor-phase Axial Deposition System," by M. J. Andrejco and E. Potkay, filed on even date herewith in the U.S. Patent and Trademark Office. The aforementioned patent application is assigned to the instant assignee and is hereby incorporated by reference herein.

Gaseous reactants such as $SiCl_4$; $GeCl_4$; $POCl_3$ or the like in an argon carrier gas flows from a source, not shown, into a flexible tube 76 and through the inner tube 16. Other gases are caused to flow through gas line connectors 53—53 to the channels 56—56 and into their respective chambers 54—54 and out the end of the nozzle 12. In an exemplary embodiment $SiCl_4$ and argon flow between tubes 16 and 18, hydrogen flows between tubes 18 and 20, argon flows between tubes 20 and 24 while oxygen flows between tubes 24 and 26. The gases flowing from the nozzle 12 are ignited and the gaseous reactants introduced into the high temperature portion of the flame near the tip of the nozzle to produce a glassy particulate or soot which is directed onto a starting member to form the soot boule (not shown).

As hereinbefore indicated, the axial position of the inner tube 16 may be readily changed. At times it may be desirable to periodically adjust the location of the discharge end of the tube 16 during deposition. By loosening the end cap 66 the tube 16 may be moved the appropriate distance and the cap 66 tightened to hold the tube at the desired position. Additionally, at times, it may be desirable to alter the deposition of the reactants in a periodic or aperiodic fashion to alter or maintain the refractive index of the resultant lightguide preform. This can easily be accomplished by loosening the cap 66 and moving the tube 16 axially in and out to controllably alter the location of the discharge end of the tube 16 during deposition. Such axial movement may be implemented manually or automatically in a well known manner.

It is to be understood that the embodiments described herein are merely illustrative of the principles of the invention. Various modifications may be made thereto by persons skilled in the art which will embody the principles of the invention and fall within the spirit and scope thereof. For instance, although all the tubes used to form the nozzle 12 were fused silica, other materials having a similar coefficient of expansion can be used.

What is claimed is:

1. A torch for fabricating lightguide preforms by the vapor-phase axial deposition process, comprising:
a plurality of coaxially aligned elongated tubes with a coaxially aligned inner tube that is movable in an axial direction relative to the other tubes during the deposition process;
each of the inner and intermediate tubes have a plurality of accurately machined splines on the outer surface thereof to maintain a predetermined distance between said tubes; and
each of the plurality of outer tubes has a radially disposed flange on a first end thereof which is separated by and captured between a plurality of annular spacer members.

2. The torch as set forth in claim 1, wherein:
the splines are elongated and have a substantially rectangular cross section, and are substantially parallel to the longitudinal axis of the tubes.

3. The torch as set forth in claim 1, wherein:
the splines are substantially hemispherical in geometry.

4. The torch as set forth in claim 1, wherein:
a conduit passes through the spacer members to direct gas or reactants in respective tubes.

* * * * *